(12) United States Patent
Acikgoz et al.

(10) Patent No.: US 9,453,174 B2
(45) Date of Patent: Sep. 27, 2016

(54) APPARATUSES AND METHODS FOR REMOVING IMPURITIES FROM A HYDROCARBON STREAM

(71) Applicant: UOP LLC, Des Plaines, IL (US)

(72) Inventors: Saadet Ulas Acikgoz, Des Plaines, IL (US); Shain Doong, Kildeer, IL (US); Lubo Zhou, Inverness, IL (US); Bhargav Sharma, Niles, IL (US)

(73) Assignee: UOP LLC, Des Plaines, IL (US)

( * ) Notice: Subject to any disclaimer, the term of this patent is extended or adjusted under 35 U.S.C. 154(b) by 286 days.

(21) Appl. No.: 14/315,926

(22) Filed: Jun. 26, 2014

(65) Prior Publication Data

US 2015/0376526 A1   Dec. 31, 2015

(51) Int. Cl.
C07C 7/12 (2006.01)
C07C 7/13 (2006.01)
C10L 3/10 (2006.01)

(52) U.S. Cl.
CPC .............. C10L 3/104 (2013.01); C10L 3/103 (2013.01); *C10L 2290/12* (2013.01); *C10L 2290/542* (2013.01); *C10L 2290/548* (2013.01)

(58) Field of Classification Search
CPC .................................. C07C 7/12; C07C 7/13
USPC ........ 585/820, 821, 822, 823, 824, 825, 826
See application file for complete search history.

(56) References Cited

U.S. PATENT DOCUMENTS

| | | | |
|---|---|---|---|
| 3,225,516 A | 12/1965 | Smith et al. | |
| 5,089,034 A * | 2/1992 | Markovs | B01D 53/04 95/123 |
| 7,442,233 B2 | 10/2008 | Mitariten | |
| 7,635,424 B2 | 12/2009 | Briot et al. | |
| 7,780,933 B2 | 8/2010 | Kikkawa | |
| 8,282,707 B2 | 10/2012 | Bresler et al. | |
| 8,388,732 B2 | 3/2013 | Doong et al. | |
| 8,388,855 B2 | 3/2013 | Rochelle et al. | |
| 8,475,566 B2 | 7/2013 | Find | |
| 8,597,411 B2 | 12/2013 | Shahin et al. | |
| 2009/0047201 A1 | 2/2009 | Carlson et al. | |
| 2010/0290977 A1 | 11/2010 | Bowers et al. | |
| 2011/0126451 A1 | 6/2011 | Pan et al. | |
| 2012/0080644 A1 | 4/2012 | Seiler et al. | |

(Continued)

FOREIGN PATENT DOCUMENTS

| | | |
|---|---|---|
| JP | 2012236155 A | 12/2012 |
| KR | 1210929 B1 | 12/2012 |

(Continued)

OTHER PUBLICATIONS

PCT International Search Report and Written Opinion dated Sep. 24, 2015, for PCT/US2015/034835.

*Primary Examiner* — Thuan D Dang

(57) ABSTRACT

Methods and apparatuses for removing impurities from a hydrocarbon stream are provided herein. In an embodiment, a method for removing impurities from a hydrocarbon stream includes providing the hydrocarbon stream that includes carbon dioxide in an amount of greater than about 50 ppm by mole. Carbon dioxide is selectively adsorbed from the hydrocarbon stream to produce a treated hydrocarbon stream that has less than or equal to 50 ppm by mole of carbon dioxide. The adsorbed carbon dioxide is desorbed to produce a raffinate stream that includes the carbon dioxide. The carbon dioxide is separated from the raffinate stream using a solvent separation technique to produce a treated raffinate stream.

9 Claims, 1 Drawing Sheet

(56) References Cited

U.S. PATENT DOCUMENTS

2013/0243677 A1 9/2013 Siskin et al.
2014/0144321 A1 5/2014 Sawamura et al.

FOREIGN PATENT DOCUMENTS

| KR | 2013047256 A | 5/2013 |
| WO | 2010005797 A2 | 1/2010 |

* cited by examiner

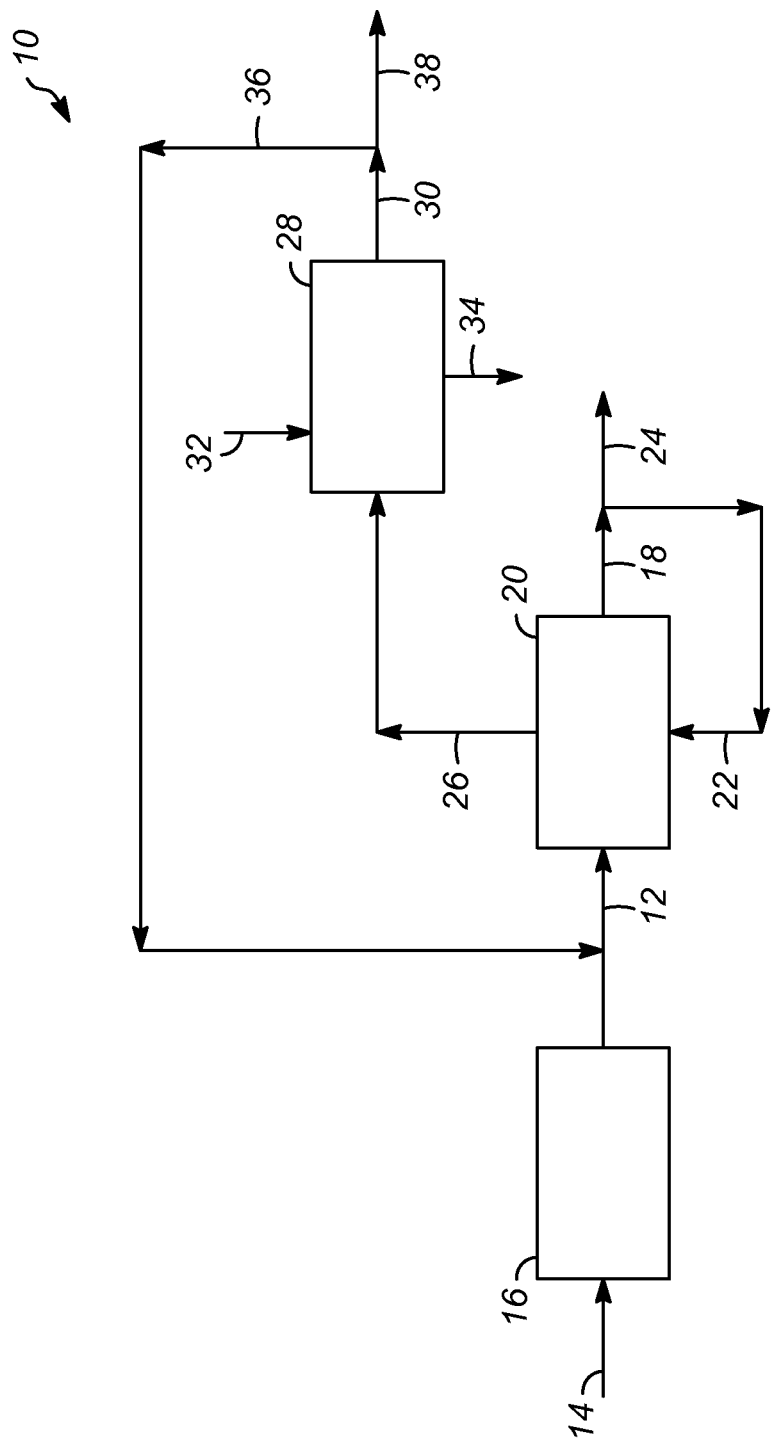

APPARATUSES AND METHODS FOR REMOVING IMPURITIES FROM A HYDROCARBON STREAM

TECHNICAL FIELD

The technical field generally relates to apparatuses and methods for removing impurities from a hydrocarbon stream. More particularly, the technical field relates to apparatuses and methods for removing impurities from a hydrocarbon stream using adsorption techniques.

BACKGROUND

Hydrocarbon streams such as natural gas often include carbon dioxide in large concentrations, especially when extracted from a well. Carbon dioxide content of the hydrocarbon streams can reach concentrations of about 50 mole % or more. Carbon dioxide is corrosive and non-combustible, so it is not desired in the hydrocarbon streams. Some natural gas pipelines establish a maximum carbon dioxide concentration of about 2 mole % or less. Hydrocarbon streams used for liquefaction frequently have a carbon dioxide concentration limit of about 50 parts per million by mole (ppm) or less, because higher concentrations will form dry ice deposits as the hydrocarbon streams are liquefied. Carbon dioxide is frequently removed from hydrocarbon streams with an aqueous amine solvent, where the carbon dioxide reacts with the amine but not with the hydrocarbons in the hydrocarbon stream. Typically, the hydrocarbon stream is passed upwards through a packed bed while the amine solvent flows downward. The amine solvent is then regenerated and re-used. A downstream adsorption unit is commonly used to remove water from the hydrocarbon stream after removal of carbon dioxide.

During separation of the carbon dioxide from the hydrocarbon stream using the amine solvent, the amine solvent must pass through the packed bed at a sufficient flow rate to absorb the carbon dioxide, and the packed bed, the pumps, and the regenerator are sized for the amount of carbon dioxide to be removed. Under circumstances where the hydrocarbon streams include low amounts of carbon dioxide, such as from greater than about 50 ppm to about 3 mole %, an amine solvent circulation rate results in a very low liquid loading of the packed bed and may result in inadequate wetting of the packed bed. Further, off-shore facilities that employ the amine solvent to remove carbon dioxide will rock and move with wave and wind action, and the motion temporarily tilts the packed bed to thereby further impact sufficient wetting of the packed bed. The efficiency of the packed bed is reduced when tilted because the amine solvent accumulates on the lower side of the packed bed while the hydrocarbon stream moves more rapidly through the upper side of the packed bed due to the reduced flow resistance from the decreased amine solvent flow. On many off-shore facilities, the packed bed, amine solvent pumps, and related equipment are oversized to account for the motion of the facility. The increased sizes of the packed bed and pumps increases the capital expense to build and install the packed bed, and also increases the operating expense to recirculate the amine solvent.

Alternative separation schemes have been proposed for separating carbon dioxide from the hydrocarbon streams to avoid the aforementioned challenges associated with packed beds. Membrane elements have been used to absorb carbon dioxide from natural gas and other vapor streams. The membrane elements do not use a packed bed, so the motion of an off-shore facility does not significantly change the operating efficiency and the membrane elements do not have to be oversized for the desired service. However, use of membrane elements results in significant loss of hydrocarbons and is inefficient when the hydrocarbon stream includes the relatively low amount of carbon dioxide. Adsorption schemes have also been proposed for separating carbon dioxide from hydrocarbon streams. However, a raffinate stream that results from desorption of the carbon dioxide is not recovered and may result in a waste stream that requires further remediation.

Accordingly, it is desirable to develop methods and apparatuses for removing impurities such as carbon dioxide from hydrocarbon streams while avoiding challenges associated with inadequate wetting of packed beds that use an amine solvent to remove carbon dioxide from hydrocarbon streams that have a low carbon dioxide content. It is also desirable to develop methods and apparatuses for removing impurities such as carbon dioxide from hydrocarbon streams that maximize hydrocarbon yield from the hydrocarbon streams. Furthermore, other desirable features and characteristics of the present embodiment will become apparent from the subsequent detailed description and the appended claims, taken in conjunction with the accompanying drawings and this background.

BRIEF SUMMARY

Methods and apparatuses for removing impurities from a hydrocarbon stream are provided herein. In an embodiment, a method for removing impurities from a hydrocarbon stream includes providing the hydrocarbon stream that includes carbon dioxide in an amount of greater than about 50 ppm by mole. Carbon dioxide is selectively adsorbed from the hydrocarbon stream to produce a treated hydrocarbon stream that has less than or equal to 50 ppm by mole of carbon dioxide. The adsorbed carbon dioxide is desorbed to produce a raffinate stream that includes the carbon dioxide. The carbon dioxide is separated from the raffinate stream using a solvent separation technique to produce a treated raffinate stream.

In another embodiment, a method for removing impurities from a hydrocarbon stream includes providing the hydrocarbon stream that includes carbon dioxide in an amount of greater than about 50 ppm by mole. Carbon dioxide is selectively adsorbed from the hydrocarbon stream to produce a treated hydrocarbon stream that has less than or equal to 50 ppm by mole of carbon dioxide. The treated hydrocarbon stream is split into a slip stream and a product stream. The adsorbed carbon dioxide is desorbed to produce a raffinate stream that includes the carbon dioxide using the slip stream as a desorbent stream. Carbon dioxide is separated from the raffinate stream to produce a treated raffinate stream.

In another embodiment, an apparatus for removing impurities from a hydrocarbon stream includes an adsorption unit that has the capacity to receive the hydrocarbon stream that includes carbon dioxide in an amount of greater than about 50 ppm by mole. The adsorption unit further has the capacity to produce a treated hydrocarbon stream that has less than or equal to 50 ppm by mole of carbon dioxide. A solvent separation unit is in fluid communication with the adsorption unit, and the solvent separation unit has the capacity to receive a raffinate stream from desorption of carbon dioxide from the adsorption unit. The adsorption unit further has the capacity to receive a portion of the treated hydrocarbon stream as a desorbent stream to produce the raffinate stream.

BRIEF DESCRIPTION OF THE DRAWINGS

The various embodiments will hereinafter be described in conjunction with the following drawing FIGURE, wherein like numerals denote like elements, and wherein:

The FIGURE is a schematic view of an apparatus and method for removing impurities from hydrocarbons in accordance with an embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Apparatuses and methods are provided that employ adsorption to separate carbon dioxide from a hydrocarbon stream that includes greater than about 50 ppm by mole of carbon dioxide, such as from greater than about 50 ppm to about 3 mole % carbon dioxide based on the total content of the hydrocarbon stream, to produce a treated hydrocarbon stream that has less than or equal to about 50 ppm by mole carbon dioxide. As such, usage of packed beds that employ a solvent separation technique to remove carbon dioxide at such low amounts can be avoided, thereby avoiding challenges associated with inadequate wetting of packed beds or required oversizing of the packed bed, solvent pumps, and related equipment. In embodiments, a solvent separation technique may be employed to separate the carbon dioxide from a raffinate stream produced by desorption of the carbon dioxide. Because the raffinate stream contains higher amounts of carbon dioxide than the hydrocarbon stream that is subject to adsorptive separation, the carbon dioxide may be separated from the raffinate stream without the challenges associated with carbon dioxide separation at the relatively low carbon dioxide concentrations in the hydrocarbon stream. Further, the treated hydrocarbon stream may be separated into a slip stream and a product stream, with the slip stream employed for desorption of the carbon dioxide to form the raffinate stream. Separation of the carbon dioxide from the raffinate stream enables recovery of the hydrocarbons from the slip stream to maximize hydrocarbon yield from the hydrocarbon stream, and the recovered hydrocarbons may be combined with the hydrocarbon stream prior to selective adsorption of the carbon dioxide therefrom or may be combined with the treated hydrocarbon stream, depending upon carbon dioxide content thereof, as described in further detail below.

An embodiment of an apparatus 10 and a method for removing impurities from a hydrocarbon stream 12 will now be described with reference to the FIGURE. As referred to herein, the hydrocarbon stream 12 is a stream that is subject to selective adsorption of impurities therefrom. The hydrocarbon stream 12 includes at least carbon dioxide as an impurity, and the carbon dioxide is present in an amount of greater than about 50 ppm by mole, thereby necessitating separation of the carbon dioxide from the hydrocarbon stream 12 prior to further processing, such as liquefaction after separation of the carbon dioxide. In embodiments, the hydrocarbon stream 12 includes carbon dioxide in an amount of from greater than about 50 ppm to about 3 mole % based on the total content of the hydrocarbon stream 12, under which conditions separation of the carbon dioxide from the hydrocarbon stream 12 using a packed bed and a solvent separation technique present challenges. Additionally, in embodiments, the hydrocarbon stream 12 may include other impurities such as water and sulfur-containing species such as hydrogen sulfide.

The hydrocarbon stream 12 may be provided from other industrial processes, or may be provided from a natural source such as a gas well, optionally after depletion of carbon dioxide to lower amounts to minimize load during selective adsorption of the carbon dioxide from the hydrocarbon stream 12. For example, in an embodiment and as shown in the FIGURE, an initial feed stream 14 is provided that has a higher carbon dioxide content than the hydrocarbon stream 12. A bulk carbon dioxide separation technique may be employed, such as carbon dioxide removal using a membrane separation technique in a membrane separation unit 16, to separate most of the carbon dioxide from the initial feed stream 14 and to produce the hydrocarbon stream 12. The membrane separation unit 16 may be a conventional membrane element used to absorb carbon dioxide from hydrocarbon streams. The membrane separation unit 16 does not use a packed bed, so the motion of an off-shore facility does not significantly change the operating efficiency and the membrane separation unit 16 need not be oversized for the desired service.

Referring again to the FIGURE, carbon dioxide is selectively adsorbed from the hydrocarbon stream 12 to produce a treated hydrocarbon stream 18 that has less than or equal to 50 ppm by mole of carbon dioxide. For example, an adsorption unit 20 may have the capacity to receive the hydrocarbon stream 12 and to produce the treated hydrocarbon stream 18 that has less than or equal to 50 ppm by mole of carbon dioxide. In embodiments, the carbon dioxide is adsorbed from the hydrocarbon stream 12 through a thermal swing adsorption (TSA) technique. Conventional TSA techniques and adsorption units that employ TSA techniques operate using temperature cycling to effect desorption or regeneration of an adsorbent material that is employed to selectively adsorb target components. In TSA techniques, the hydrocarbon stream 12 may be fed to one or more adsorption beds that preferentially absorb at least one component from the hydrocarbon stream 12. The hydrocarbon stream 12 is fed to the one or more adsorption beds at relatively low temperatures to effectuate adsorption of the at least one component (for purposes herein, carbon dioxide and optionally sulfur-containing species and water). The adsorption beds, because of packing of the adsorbent material, contain voids within which the hydrocarbons accumulate, thereby separating the hydrocarbons from the carbon dioxide and/or other impurities that are adsorbed by the adsorbent material. At a defined time, feed to the adsorption bed is terminated and the adsorption bed is regenerated by desorbing the adsorbed components with a desorbent stream 22 at relatively higher temperatures than the hydrocarbon stream 12, with the relatively higher temperatures enabling desorption of the preferentially adsorbed components.

As set forth above, the adsorption unit 20 includes the one or more adsorbent beds that include adsorbent material. Different adsorbent materials may be employed to selectively adsorb different chemical species, and the different adsorbent materials may be provided as separate and distinct adsorbent beds (not shown) within the adsorption unit 20. In embodiments, the adsorption unit 20 includes at least one adsorbent bed that is capable of preferentially adsorbing the carbon dioxide over hydrocarbons from the hydrocarbon stream 12. Suitable adsorbent material for preferentially adsorbing carbon dioxide includes 13× molecular sieve. In embodiments, the adsorption unit 20 further includes at least one adsorbent bed that is capable of preferentially adsorbing other impurities that may be in the hydrocarbon stream 12, including sulfur-containing species and water. For example, silica gel adsorbent is effective to selectively adsorb certain organic sulfurs and bulk water. 5 A molecular sieve is effective to selectively adsorb hydrogen sulfide, methyl mercaptan, sulfur-containing species of similar number average molecular weight as methyl mercaptan, and water. In embodiments, the adsorption unit 20 includes an adsorbent bed including silica gel adsorbent, followed by a bed of 5 A molecular sieve adsorbent, followed by a bed of 13× molecular sieve, as positioned in a direction of flow of the hydrocarbon stream 12. However, it is to be appreciated that any configuration of adsorbent beds including various adsorbent materials including the aforementioned materials, as well as other adsorbent materials such as other zeolitic molecular sieves, activated carbon, activated alumina, and the like, may be employed depending upon the particular impurities that are to be removed beyond carbon dioxide.

As set forth above, selective adsorption of the carbon dioxide from the hydrocarbon stream 12 produces the treated hydrocarbon stream 18 that has less than or equal to 50 ppm by mole of carbon dioxide, and that may further be depleted of additional impurities such as sulfur-containing species and water. Removal of water, in particular, by selective adsorption may provide further advantages over conventional techniques that employ amine solvent to remove carbon dioxide from hydrocarbon streams, which generally require an additional dehydration unit to remove the water after removal of the carbon dioxide. In this regard, the treated hydrocarbon stream 18 may be employed in downstream processes in the absence of dehydration in a dehydration unit. In an embodiment and as shown in the FIGURE, a portion of the treated hydrocarbon stream 18 may be employed as the desorbent stream 22, although it is to be appreciated that the entire treated hydrocarbon stream 18 may be employed as the desorbent stream 22. For example, the treated hydrocarbon stream 18 may be split into a slip stream 22 and a product stream 24. In this embodiment, the slip stream 22 is employed as the desorbent stream 22 to desorb the impurities, including the carbon dioxide, from the adsorption unit 20. While use of the slip stream 22 may enhance process efficiency and avoid the need for independent or separate industrial streams, it is to be appreciated that other streams may be employed for desorption of the impurities from the adsorption unit 20. For example, in other embodiments and although not shown, the impurities, including adsorbed carbon dioxide, are desorbed from the adsorption unit 20 using a portion of a treated raffinate stream 30 (described in further detail below), although it is to be appreciated that the entire treated raffinate stream 30 may be employed as the desorbent stream 22. Desorption of the impurities from the adsorption unit 20 with the desorbent stream 22 produces a raffinate stream 26 that includes carbon dioxide and any other impurities that are adsorbed from the hydrocarbon stream 12.

The carbon dioxide, as well as other impurities that may be present in the raffinate stream 26, is separated from the raffinate stream 26 to produce the treated raffinate stream 30. The raffinate stream 26 generally has a higher concentration of carbon dioxide, as well as sulfur-containing species and water, than the hydrocarbon stream 12. For example, the raffinate stream 26 may have a carbon dioxide concentration of at least 1 mole %, such as from about 1 to about 10 mole %, or such as from greater than 3 to about 10 mole %, based on the total content of the raffinate stream 26. Due to the higher concentration of the impurities in the raffinate stream 26, separation techniques may be employed to separate the carbon dioxide and other impurities from the raffinate stream 26 without the attendant challenges set forth above that are associated with separating the carbon dioxide from the hydrocarbon stream 12. In particular, the carbon dioxide may be separated from the raffinate stream 26 using a solvent separation technique. For example and referring to the FIGURE, a solvent separation unit 28 may be in fluid communication with the adsorption unit 20, and the solvent separation unit 28 may have the capacity to receive the raffinate stream 26 from desorption of carbon dioxide from the adsorption unit 20 and to contact the raffinate stream 26 with a solvent stream 32.

In an embodiment, the carbon dioxide is separated from the raffinate stream 26 using a chemical solvent separation technique. In this embodiment, the solvent stream 32 includes a chemical solvent such as, but not limited to, an aqueous amine solution. Many different amines can be used in the aqueous amine solution such as, but not limited to, monoethanol amine, diethanol amine, methyl diethanol amine, triethanol amine, 2-amino-2-methyl-1-propanol, diglycol amine, diisopropanol amine, piperazine, other amines, or combinations thereof. Solvent separation units that employ aqueous amine solutions are known in the art. For example, the solvent separation unit 28 may include a packed column (not shown), and the raffinate stream 26 may be contacted with the aqueous amine solution in the packed column of the solvent separation unit 28. In some embodiments, the amine is present in the aqueous amine solution at a concentration of from about 20 to about 60 weight % and water is present at a concentration of from about 40 to about 80 weight %, both based on the total weight of the aqueous amine solution.

In the solvent separation unit 28 that employs the aqueous amine solution, acid gas such as carbon dioxide, hydrogen sulfide, and/or possibly other impurities reacts with the amine in the aqueous amine solution to form weak chemical bonds with the amine at elevated pressure, thereby absorbing the acid gas into the liquid aqueous amine solution while the other components of the raffinate stream 26 remain in gaseous form. The amine may react and form an ionic bond with the carbon dioxide or hydrogen sulfide, for example through the following mechanisms:

where R is hydrogen or an organic compound. A spent solvent stream 34 (in this embodiment, spent aqueous amine solution) carries with it the acid gases and may then be remediated to separate the acid gas therefrom. In particular, the reaction of the amine with the carbon dioxide or hydrogen sulfide is reversible, and high temperatures tend to break the ionic bond and form the free amine and gaseous carbon dioxide and/or hydrogen sulfide.

In another embodiment, the carbon dioxide is separated from the raffinate stream 26 using a physical solvent separation technique. The physical solvent separation technique may be particularly effective under circumstances where the hydrocarbon stream 12 includes the sulfur-containing species and where the sulfur-containing species is selectively adsorbed from the hydrocarbon stream 12 and included in the raffinate stream 26. In this embodiment, the solvent stream 32 includes a physical solvent such as, but not limited to, a solution including dimethyl ether of polyethylene glycol, methanol, N-methyl-2-pyrrolidone (NMP), propylene carbonate, methyl isopropyl ether of polyethylene glycol (MPE), tributyl phosphate, methylcyanoacetate, or a combination thereof. Many different dimethyl ethers can be used in the physical solvent such as, but not limited to, $CH_3O(C_2H_4O)_nCH_3$, where n is from 2 to 9. Solvent separation units that employ physical solvents are known in the art. For example, the solvent separation unit 28 may include a packed column (not shown), and the raffinate stream 26 may be contacted with the physical solvent in the packed column of the solvent separation unit 28.

In the solvent separation unit 28 that employs the physical solvent, acid gas such as carbon dioxide, hydrogen sulfide, and/or possibly other impurities is dissolved or absorbed from the raffinate stream 26 by the physical solvent at elevated pressures such as from about 2 to about 14 MPa, with the physical solvent remaining in liquid form while the other components of the raffinate stream 26 remain in gaseous form. The spent solvent stream 34 may be remediated to separate the acid gas from the physical solvent by depressurizing and/or steam stripping the spent solvent stream 34. In embodiments, sulfur-containing species and carbon dioxide can also be selectively recovered as separate streams.

In embodiments and depending upon residual concentrations of the impurities in the treated raffinate stream 30, the treated raffinate stream 30 may be taken as a product stream and optionally combined with the treated hydrocarbon stream 18, may be split between a recycle stream 36 and a raffinate product stream 38, or may be completely recycled back as the recycle stream 36. For example, in embodiments, the carbon dioxide and optionally other impurities may be separated from the raffinate stream 26 to produce the treated raffinate stream 30 having a higher carbon dioxide content (or higher content of other impurities) than the treated hydrocarbon stream 18. Thus, in this embodiment, direct combination of the treated raffinate stream 30 and the treated hydrocarbon stream 18 may not be ideal. However, referring to the FIGURE, at least a portion of the treated raffinate stream 30 may be taken as a recycle stream 36, and the recycle stream 36 may be combined with the hydrocarbon stream 12 prior to selectively adsorbing carbon dioxide therefrom. In this regard, the higher carbon dioxide concentration in the treated raffinate stream 30 does not impact carbon dioxide concentration in the treated hydrocarbon stream 18 while removing some carbon dioxide from the process, and yield of hydrocarbons from the hydrocarbon stream 12 may be maximized while minimizing unit sizes for the solvent separation unit 28.

In another embodiment and although not shown, the carbon dioxide is separated from the raffinate stream 26 using a combination of chemical and physical solvent separation techniques. For example, two solvent separation units may be employed either in parallel or in series, with the solvent separation units employing physical solvent and chemical solvent, respectively.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for removing impurities including water, sulfur-containing species, and carbon dioxide from a hydrocarbon stream containing methane, wherein the method comprises the steps of:
   providing the hydrocarbon stream comprising methane, water, sulfur-containing species, and carbon dioxide in an amount of greater than 50 ppm by mole;
   selectively adsorbing carbon dioxide, water, and sulfur from the hydrocarbon stream in an adsorption unit including a bed of silica gel adsorbent, followed by a bed of 5 A molecular sieve adsorbent, and followed by a bed of 13× molecular sieve adsorbent to produce a treated hydrocarbon stream having less than 50 ppm by mole of carbon dioxide and reduced amounts of water and sulfur compounds;
   splitting the treated hydrocarbon stream into a slip stream and a product stream;
   desorbing the adsorbed carbon dioxide to produce a raffinate stream comprising the carbon dioxide by using the slip stream as a desorbent stream;
   separating carbon dioxide from the raffinate stream using a chemical or physical solvent separation technique to produce a treated raffinate stream having a higher carbon dioxide content than the treated hydrocarbon stream;
   splitting the treated raffinate stream into a first portion and a second portion;
   combining a first portion of the treated raffinate stream with the product stream for liquefaction; and
   recycling a second portion of the treated raffinate stream to the adsorption step.

2. The method of claim 1, wherein providing the hydrocarbon stream comprises providing the hydrocarbon stream comprising carbon dioxide in an amount of from greater than about 50 ppm to 3 mole % based on the total content of the hydrocarbon stream.

3. The method of claim 1, wherein desorbing the adsorbed carbon dioxide comprises desorbing the adsorbed carbon dioxide using a portion of the treated raffinate stream.

4. The method of claim 1, wherein separating the carbon dioxide from the raffinate stream further comprises separating the sulfur-containing species from the raffinate stream.

5. The method of claim 4, wherein separating the carbon dioxide and the sulfur-containing species from the raffinate stream comprises separating the carbon dioxide and the sulfur-containing species from the raffinate stream using a physical solvent separation technique.

6. The method of claim 1, wherein separating the carbon dioxide from the raffinate stream comprises separating the carbon dioxide from the raffinate stream using a chemical solvent separation technique.

7. The method of claim 6, wherein separating the carbon dioxide from the raffinate stream comprises separating the carbon dioxide from the raffinate stream by contacting an aqueous amine solvent with the raffinate stream.

8. The method of claim 1, further comprising providing an initial feed stream having a higher carbon dioxide content than the hydrocarbon stream.

9. The method of claim 8, further comprising removing carbon dioxide from the initial feed stream using a membrane separation technique to produce the hydrocarbon stream.

* * * * *